(No Model.)

S. L. KINSEY.
TWO WHEELED VEHICLE.

No. 402,020.  Patented Apr. 23, 1889.

ATTEST.
Victor J. Evans.
James S. Smith

INVENTOR.
Seth L. Kinsey.
By W. A. Redmond, Atty.

UNITED STATES PATENT OFFICE.

SETH L. KINSEY, OF GRACETON, MARYLAND.

TWO-WHEELED VEHICLE.

SPECIFICATION forming part of Letters Patent No. 402,020, dated April 23, 1889.

Application filed July 30, 1888. Serial No. 281,357. (No model.)

*To all whom it may concern:*

Be it known that I, SETH L. KINSEY, a citizen of the United States, residing at Graceton, in the county of Harford and State of Maryland, have invented certain new and useful Improvements in Two-Wheeled Vehicles; and I do hereby declare the following to be a full, clear, and exact description of the invention, such as will enable others skilled in the art to which it appertains to make and use the same.

This invention relates to two-wheeled vehicles; and it has for its object to provide a vehicle of this class in which the body of the vehicle will have a perfect adjustment and bearing under varying loads, and by the adjustment of its hang-rods the spring may be increased or decreased in stiffness to meet the requirements of varying loads, and also by means of the peculiar arrangement of spring and attachment of front of body or bed to the thills permit of a forward and backward movement of the body, and thus afford an easy-riding cart without horse motion; and it consists of the parts and combinations of parts hereinafter described and claimed.

Figure 1:
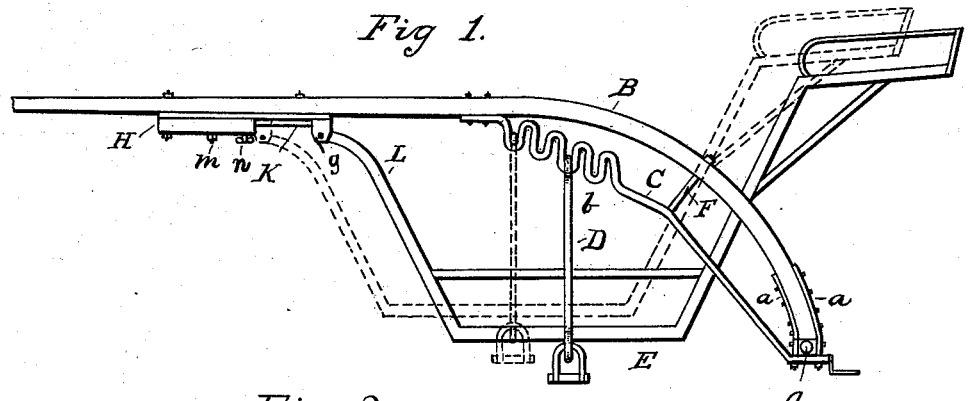
Figure 2:
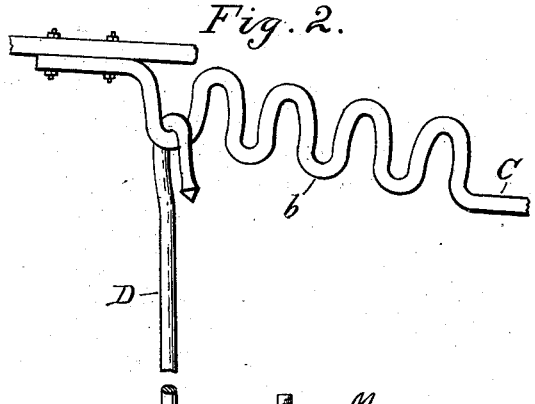

In the accompanying drawings, forming a part of this specification, Figure 1 is a side elevation of my improved cart with the wheels removed; Fig. 2, a detail view of hangers and brace-rods, and Fig. 3 a detail longitudinal section of the device for attaching the bed to the thills.

Similar letters refer to similar parts throughout the views.

A represents the axle of my improved cart, to which the ends of the thills B are rigidly secured by means of the irons $a$, secured to the thills and extending beyond the ends of the same on each side of the axle, and, passing through the flattened ends of the brace-rods C, are there secured by means of nuts run on the threads formed on said irons, so that the axle turns with the thills when the latter are moved. The brace-rods C extend forward from the axle a suitable distance and have their ends secured to the under side of the thills, as shown, and are formed with a series of bends or corrugations, as at $b$, into which hooks the ends of the hangers D, to support the bed E of the vehicle. Said hangers may be adjusted back or forth into different loops or bends $b$ of the brace in order to change the bearings as desired. From the brace-rods C, near the bends $b$, a rod, F, extends to the thills, and is there secured in order to prevent the braces bending when heavy loads are to be carried.

The lower ends of the hangers D are formed with eyes $c$, which are fitted to loops $d$, said loops being pivotally secured or shackled to the free ends of a leaf-spring, G, secured directly at the center of the bed of the vehicle.

The object of securing the spring G at the center of the under side of the bed of the vehicle is to permit the body to move or swing forward and backward without a tipping movement, this owing to the fact that the body is supported by the spring and the latter by the hangers D, which are loosely connected to said spring and to the brace-rods, and which swing or move with the body and thus take up the horse motion. The front end of the bed is secured to the thills through its rocker-arms L, so that the body may have a forward or backward movement, as described, this being accomplished by the peculiar means I employ for attaching the parts.

Figure 3:
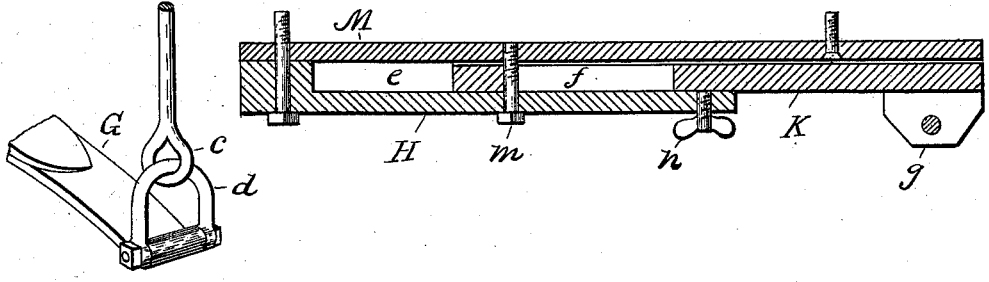

As clearly shown in Fig. 3, H is a metal block or bar having a groove, $e$, formed lengthwise in the same, into which is fitted a slide, K, having a slot, $f$, formed in its body, and shackle-eyes $g$, formed on its end, to which the ends of the rocker-arms L are pivotally secured by means of bolts, as shown in Fig. 1, thus permitting the arms to rock on said bolts as the body moves back or forth. The block H is covered by a plate, M, which extends beyond the inner end of the block to form a way for the slide K, and the whole is securely bolted to the under side of the thills. A bolt, $m$, passes through a perforation in the under side of the block and through the slot in slide K and into plate M, thus forming a stop for or limiting to the movement of the slide to the length of said slot and preventing the same being withdrawn from the groove $e$. A thumb-screw, $n$, is inserted in a screw-threaded perforation in the block near its inner end, and engages the slide K to hold the same in any position to which it may be set or adjusted when it is desired to hold the same rigid.

It will be seen that the body may move back or forth or swing on the hangers D, and that the slide will move in its groove or recess in the block, said movement of the body being limited by the length of the slot, and that the body being hung on the spring and the latter supported by hangers which are movable in all directions that the horse motion will all be taken up and a very easy riding-cart provided.

Having thus described my invention, what I claim as new, and desire to secure by Letters Patent, is—

1. The combination, in a two-wheeled vehicle, of the thills secured to the axle, the corrugated brace extending from the axle to said thills, the hangers having their upper ends adjustably and loosely connected to said brace-rods, and their lower ends having eyes, the spring secured at the center of the bed and provided with loops on its ends, and said loops being connected with said eyes, whereby the bed may have a back-and-forth and sidewise movement, substantially as described.

2. The combination, in a two-wheeled vehicle, of the thills secured to the axle, the bed or body, the spring centrally secured to the bottom of the body and having the loops on its ends, the brace-rods, the hangers having their hook ends loosely connected to said brace-rods and their eye ends loosely connected with the loops, the blocks having grooves secured to said thills, the slotted slides working in said grooves, the bolts limiting the movement of said slides, set-screws engaging said slides, and the rocker-arms pivotally attached to said slides, substantially as described.

In testimony whereof I affix my signature in presence of two witnesses.

SETH L. KINSEY.

Witnesses:
OCTAVIUS KNIGHT,
VICTOR J. EVANS.